United States Patent
Yoon et al.

(10) Patent No.: US 9,611,592 B2
(45) Date of Patent: Apr. 4, 2017

(54) NON-SOLIDIFYING RUBBERIZED ASPHALT COMPOSITION FOR PROVIDING INPERMEABLE INTERMEDIATE DRAINAGE LAYER AND METHOD FOR PROVIDING INPERMEABLE INTERMEDIATE DRAINAGE LAYER WITH SINGLE PAVING PROCESS USING THE SAME

(71) Applicant: AR&C CO.,LTD., Uiwang-si, Gyeonggi-do (KR)

(72) Inventors: Seng Woo Yoon, Uiwang-si (KR); Jang Sup Kim, Suwon-si (KR)

(73) Assignee: AR&C CO., LTD., Uiwang-si, Gyeonggi-Do (KR)

( * ) Notice: Subject to any disclaimer, the term of this patent is extended or adjusted under 35 U.S.C. 154(b) by 6 days.

(21) Appl. No.: 15/012,236

(22) Filed: Feb. 1, 2016

(65) Prior Publication Data

US 2016/0222596 A1    Aug. 4, 2016

(30) Foreign Application Priority Data

Feb. 3, 2015   (KR) .................... 10-2015-0016944

(51) Int. Cl.
*E01C 7/30*    (2006.01)
*E01C 7/35*    (2006.01)
(Continued)

(52) U.S. Cl.
CPC ............ *E01C 7/358* (2013.01); *C09D 195/00* (2013.01); *E01C 7/30* (2013.01); *E01C 11/24* (2013.01);
(Continued)

(58) Field of Classification Search
CPC . E01C 7/358; E01C 7/30; E01C 19/22; E01C 11/24
See application file for complete search history.

(56) References Cited

U.S. PATENT DOCUMENTS

| | | | |
|---|---|---|---|
| 2004/0157994 A1* | 8/2004 | Kubo | C08F 8/00 525/88 |
| 2005/0171276 A1* | 8/2005 | Matsuda | C08C 19/02 524/572 |

FOREIGN PATENT DOCUMENTS

| | | | |
|---|---|---|---|
| JP | 2008-106149 | * 5/2008 | ............ C08F 297/04 |
| KR | 10-2006-0127823 A | 12/2006 | |

(Continued)

*Primary Examiner* — Robert Harlan
(74) *Attorney, Agent, or Firm* — LRK Patent Law Firm (57) ABSTRACT

The present invention relates to a paving method of forming an intermediate layer, where a non-solidifying rubberized asphalt penetrates, on an asphalt mixture for base layer or a cement concrete to provide a permeable layer and an impermeable (intermediate) layer simultaneously with a single paving process for surface layer. The waterproofing and draining functions of the non-solidifying rubberized asphalt layer completely block water or moisture from penetrating into the underlying layer and protect the roads from damage due to freezing temperature with the moisture penetrating into the group in winter. The non-solidifying rubberized asphalt layer constituting the intermediate layer has the non-solidifying rubberized asphalt melt down and move upwards under the paving temperature and pressure applied during the paving process of forming a surface layer and firmly bind with the base layer, thereby completing an integrated pavement structure with enhanced water resistance and durability.

6 Claims, 6 Drawing Sheets

(51) Int. Cl.
*E01C 11/24* (2006.01)
*C09D 195/00* (2006.01)
*E01C 19/22* (2006.01)
*E01C 19/48* (2006.01)

(52) U.S. Cl.
CPC .......... *E01C 19/22* (2013.01); *E01C 19/4833* (2013.01)

(56) References Cited

FOREIGN PATENT DOCUMENTS

| KR | 2008-106149 A | 5/2008 | | |
|---|---|---|---|---|
| KR | 10-2010-0121026 A | 11/2010 | | |
| KR | 10-2012-0007237 A | 1/2012 | | |
| KR | 10-2012-0070153 | * | 6/2012 | ............... E01C 7/18 |
| KR | 10-2012-0070153 A | 6/2012 | | |
| KR | 10-2012-0120586 A | 11/2012 | | |
| KR | 10-1316901 B1 | 10/2013 | | |

\* cited by examiner

NON-SOLIDIFYING RUBBERIZED ASPHALT COMPOSITION FOR PROVIDING INPERMEABLE INTERMEDIATE DRAINAGE LAYER AND METHOD FOR PROVIDING INPERMEABLE INTERMEDIATE DRAINAGE LAYER WITH SINGLE PAVING PROCESS USING THE SAME

CROSS-REFERENCE TO RELATED APPLICATIONS

This application claims priority to Korean Patent Application No. 10-2015-0016944, filed on Feb. 3, 2015, the content of which is incorporated herein by reference in its entirety.

BACKGROUND OF THE INVENTION

1. Field of the Invention

The present invention relates to a drainage asphalt composite paving method for forming an impermeable drainage intermediate layer using a paving material including a non-solidifying rubberized asphalt with a single paving process, and a paving material composition including a non-solidifying rubberized asphalt used in the paving method, and more particularly to a paving method for providing a drainage pavement and an impermeable intermediate layer at the same time by using a paving material composition including the non-solidifying rubberized asphalt of the present invention to form a non-solidifying rubberized asphalt penetration layer in place of the intermediate layer of the conventional drainage pavement, and a paving material composition used in the paving method.

More specifically, the present invention relates to a road pavement method that involves applying a road pavement adhering to the underlying base layer to offer a waterproof performance, protect the base layer from penetration of water or moisture and prevent erosion of the road and adhering to the overlying surface layer to maintain the noise-reducing and draining performances, and more particularly to a drainage asphalt paving method and a paving material composition used in the paving method, where during the drainage asphalt paving process, the non-solidifying rubberized asphalt in the paving material melts down and moves upwards from the bottom of the drainage pavement to firmly bind with the overlying layer, thereby increasing the coupling force between the layers and enhancing the performances, such as acid resistance, alkali resistance, saline resistance, etc., to further increase the durability of the final pavement.

2. Description of Related Art

In general, the drainage asphalt road pavement consists of a surface layer, an intermediate layer and a base layer. The surface layer is made with a design of mixing proportion to have higher inter-aggregate porosity than the normal road pavements in order to ensure the more effective and rapid drainage in rich rainfall and the noise-reducing function.

However, the current drainage paving materials are poor in resistance to water or moisture, easy to tear or exfoliate due to low inter-aggregate coupling strength and often liable to get early damages with pore cave-in or clogging soon after the paving process.

Like this, the surface layer that is in direct contact with and exposure to the exterior may have the difficulty of achieving effective drainage and noise-reducing performances that are the most important functions of the drainage pavement, due to the use of a paving material not guaranteed in the quality.

Further, repairing a damaged drainage pavement by applying a second coating of the paving material costs higher than repairing general asphalt pavements and unnecessarily requires the process of laying an intermediate layer in the drainage pavement during the paving process. But, most of the drainage paving methods involves laying the surface layer right on the base layer, consistently causing damages of the surface layer.

As the prior art for solving this problem, Korea Laid-Open Patent No. 2012-0070153 discloses a noise-reducing drainage pavement and its paving method, which is contrived to solve the problem with the prior art. This prior art uses an emulsified asphalt as an adhesive resin (adhesive layer) material between the base layer and the surface layer to offer high permeability and good workability at room temperature with ease and convenience. But, the emulsified asphalt is inferior to the general asphalts in regards to the properties such as strength or elasticity and has the difficulty in increasing the adhesiveness and the adhering effect as an intermediate medium between the base layer and the surface layer with a defined range of the pavement thickness. Further, the emulsified asphalt displays low elasticity and high risk of brittleness at low temperature of 0° C. or below, so the adhesive layer is still liable to break by the load and impact transferred from the overlying surface layer.

The conventional cement concrete pavement is provided by a method of cutting the working region, applying an emulsion to the cut-off area and spreading an asphalt mixture for drainage surface layer. Such a method employs an emulsion in order to help binding two different materials like asphalt and concrete together. Like the above-mentioned emulsified asphalt, the emulsion displays low elasticity and high risk of brittleness at low temperature and has the inter-layer adhesive area easily to break to lose the water draining function in rich rainfall, allowing water to penetrate into the ground as well as the base layer, causing degradation of the cement concrete and ground subsidence and shortening the lifespan of the pavement.

On the other hand, the present invention makes the use of a non-solidifying rubberized asphalt layer as an intermediate layer that functions as a medium like a waist between the surface layer and the base layer and forms the non-solidifying rubberized asphalt layer as an impermeable layer in the form of an intermediate layer with a single paving process of forming the surface layer in an easy and simple manner, thereby increasing the adhesive strength with the underlying base layer and enhancing the coupling strength with the overlying aggregates beneath the surface layer.

In addition, such an impermeable layer in the form of an intermediate layer secures a perfect waterproofing function to fundamentally keep the water from penetrating into the underlying base layer from the drainage pavement, thereby preventing possible breaks or other damages caused by penetration of water.

Such a drainage pavement method is applicable to asphalt or cement road pavements. Advantageously, the non-solidifying rubberized asphalt used in the present invention can provide a simple solution to the problems possibly occurring in association with inappropriate choice and management of aggregates in the Japanese hybrid process and failed control in regards to the temperature and viscosity of the composition and the asphalt binder.

Further, by eliminating the process of forming an intermediate layer to a thickness of 4 to 5 cm as used in the conventional paving process, the present invention can decrease the height of the final pavement, reduce the incidental expenses for the paving materials and process and offer high elasticity and stretching performance peculiar to the non-solidifying rubberized asphalt used as the intermediate layer, resulting in a good effect of mitigating load and impacts transferred from top to bottom of the road and thus making it possible to install the road pavement with more safety and durability.

BRIEF SUMMARY OF THE INVENTION

For solving the above-mentioned overall problems with the drainage asphalt pavement, it is an object of the present invention to eliminate the problems, such as damages of the drainage pavement due to water or moisture penetration or frost penetration, deterioration of workability or the extended opening time in a separate paving process of forming a surface layer after the conventional paving process of providing an intermediate layer, and to form an impermeable drainage intermediate layer by performing a single paving process of forming the surface layer in an easy and simple way.

It is another object of the present invention to form an impermeable layer in the form of an intermediate layer having a waterproofing function as well as the draining and noise-reducing functions like the conventional road paving method, so that the good elasticity and stretching performance peculiar to the non-solidifying rubberized asphalt used in the intermediate layer can secure a good effect of mitigating the load and impacts transferred from top to bottom of the road, thereby maintaining the road pavement with more safety and durability.

For solving the problems with the prior art and achieving the objects of the present invention, there is provided a non-solidifying rubberized asphalt composition that can be used to form an impermeable drainage intermediate layer with a single paving process, the asphalt composition including 80 to 90 wt. % of asphalt having a penetrability of 60 to 80, 5 to 15 wt. % of a modifier, 3 to 10 wt. % of a process oil, 0.5 to 4 wt. % of a strength reinforcing agent, 0.1 to 1 wt. % of an additive, 0.1 to 1 wt. % of an antioxidant, and 0.1 to 0.5 wt. % of an interlayer adherence promoter, and having a viscosity of 3,000 to 100 cP at temperature of 130 to 170° C. Preferably, the process oil is a petroleum-, coal- or vegetable-based oil.

In another aspect of the present invention, there is provided a drainage asphalt composite paving method that can be used to form an impermeable intermediate layer and a drainage surface layer with a single paving process, the paving method including: (1) laying the non-solidifying rubberized asphalt composition of the present invention to a thickness of 2 to 8 mm on the surface of a surface-cut asphalt, cement concrete or base layer; (2) applying sand on the non-solidifying rubberized asphalt composition laid in the step (1); and (3) laying a mixture for drainage surface layer on the sand applied in the step (2) and performing a tamping. In the tamping process of the step (3), the non-solidifying rubberized asphalt composition may penetrate into the drainage surface layer and form the impermeable drainage intermediate layer.

Preferably, the non-solidifying rubberized asphalt composition is laid at temperature of 130 to 170° C. In the step (3), the drainage surface layer is formed using aggregates having the maximum size of 3 to 13 mm and a porosity of at least 20%.

Preferably, in the step (2), the sand applied is silica having a particle diameter of 2 to 200 mesh or 2.5 mm to 0.1 μm. In the step (3), the composition for drainage surface layer comprises 90 to 96 wt. % of aggregates and 4 to 10 wt. % of a drainage modified asphalt binder heated up to 130 to 160° C.

Preferably, the non-solidifying rubberized asphalt composition is preparing by mixing and dispersing an asphalt having a penetrability of 60 to 80, a process oil and a modifier, adding an additive to cause a reaction for about one hour, adding an antioxidant and a strength reinforcing agent, applying an agitation, and adding an interlayer adherence promoter for last.

Using the paving material composition including non-solidifying rubberized asphalt according to the present invention makes it possible to form an intermediate layer, into which the non-solidifying rubberized asphalt penetrate, on an asphalt mixture or cement concrete for base layer and to form a permeable layer and an impermeable (intermediate) layer in an easy and simple way with a single paving process of providing a surface layer.

The impermeable drainage intermediate layer including the non-solidifying rubberized asphalt as formed by the above-mentioned paving method has good waterproof and draining functions, so it can almost completely prevent absorption of water or moisture from the underlying layer and protect the road from any damage possibly caused by the water frost in the ground in cold weather.

Further, the non-solidifying rubberized asphalt that constitutes the intermediate layer is formed in advance to be adsorbed onto the underlying layer and melt down under the paving temperature and pressure applied in the paving process of providing the surface layer to move upwards and get bound to the base layer more firmly, forming an integrated pavement with enhanced water resistance and durability.

The non-solidifying rubberized asphalt used in the present invention is excellent in elasticity and stretching performance and thus has high restoring force against fatigue cracks, deformation, or the like possibly occurring by the effect of the load and pressure transferred from the surface layer, so it can offer high stability and durability to the final pavement.

Besides, the present invention involves self-forming an intermediate layer by applying a non-solidifying rubberized asphalt as thin as 2 to 8 mm and allowing it to penetrate into the drainage pavement, instead of performing the conventional paving process of providing the intermediate layer to a thickness of about 5 cm. This can minimize the total thickness of the pavement and shorten the working time and the opening time to secure efficient workability.

DETAILED DESCRIPTION OF THE INVENTION

The drainage asphalt composite paving method of forming an impermeable drainage intermediate layer using a paving material composition including a non-solidifying rubberized asphalt according to the present invention forms an intermediate layer using the non-solidifying rubberized asphalt having the inter-layer adhesive strength enhanced while maintaining the draining and noise-reducing functions, so it can suppress the inter-layer separation and overcome the problem in regards to brittleness at low temperature.

Further, the present invention can secure high stability and durability against the external factors such as pressure or load, or the cracks or deformation of the pavement occurring as a result of ageing and also offer the functions as an impermeable layer to prevent water or moisture from penetrating into the base layer in rich rainfall or heavy snow, thereby overcoming the problems such as erosion or sinkage of the road possibly caused by water and eventually increasing the lifespan of the pavement greatly.

Figure 1:
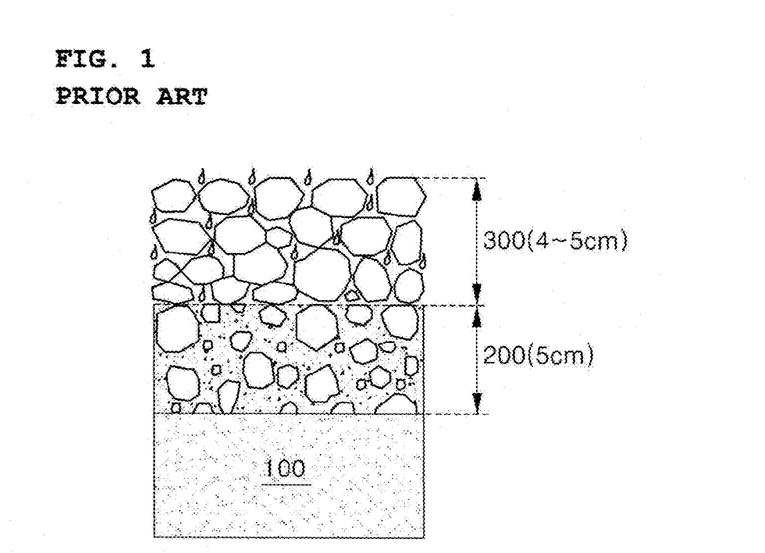
FIG. 1 is an illustration showing the cross-section of a road pavement including an intermediate layer having a thickness of about 4 to 5 cm according to the prior art.
Figure 2:
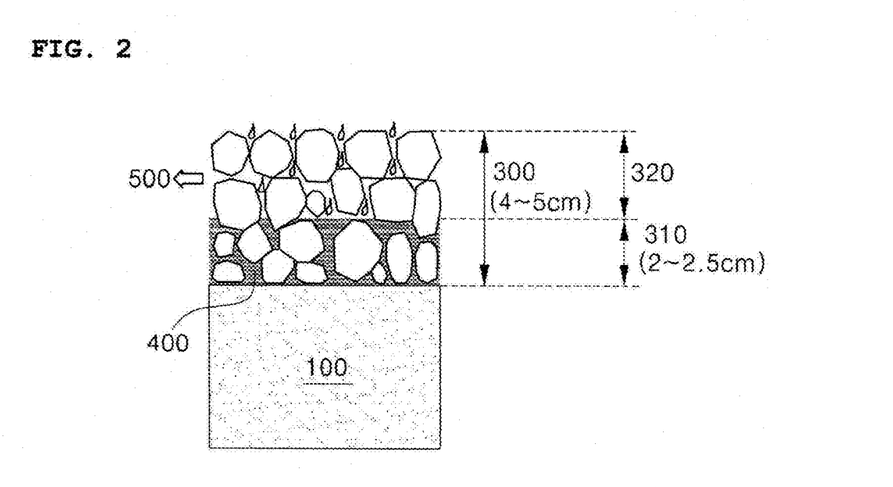
FIG. 2 is an illustration showing the cross-section of a road pavement using a non-solidifying rubberized asphalt layer according to the present invention.

For the sake of explaining the characteristics of the cross-sectional structure of the drainage asphalt pavement using the non-solidifying rubberized asphalt according to the present invention, FIG. 1 illustrates the cross-sectional structure of a pavement including an intermediate layer having a thickness of 4 to 5 cm according to the prior art, and FIG. 2 illustrates the cross-sectional structure of a pavement using the non-solidifying rubberized asphalt as an intermediate layer according to the present invention.

As can be seen from FIGS. 1 and 2, the drainage asphalt composite paving method using a paving material including a non-solidifying rubberized asphalt according to the present invention eliminates the process of providing an intermediate layer having a thickness of 4 to 5 cm as used in the conventional drainage asphalt pavement, so it can reduce the total height of the pavement and curtail the required time and cost in the process of forming an intermediate layer.

In the case of a new road, the method of forming an impermeable drainage intermediate layer using the non-solidifying rubberized asphalt composition of the present invention with a single paving process may be employed after the application of an asphalt pavement for base layer. Preferably, the paving process may be used after cutting the surface of the existing asphalt pavement to a depth of about 2 to 5 cm, or the surface of the cement concrete pavement to a depth of about 2 to 5 cm.

The non-solidifying rubberized asphalt composition used to form the impermeable drainage intermediate layer acts as an intermediate (impermeable) layer that offers an almost perfect waterproofing function, increases the adhesive strength between the pavements and enhances the durability.

The non-solidifying rubberized asphalt composition used in the present invention may include 80 to 90 wt. % of asphalt having a penetrability of 60 to 80, 5 to 15 wt. % of a modifier, 3 to 10 wt. % of a process oil, 0.5 to 4 wt. % of a strength reinforcing agent, 0.1 to 1 wt. % of an additive, 0.1 to 1 wt. % of an antioxidant, and 0.1 to 0.5 wt. % of an interlayer adhesion promoter, and have a viscosity of 3,000 to 100 cP at temperature of 130 to 170° C.

Preferably, the non-solidifying rubberized asphalt composition is prepared by mixing and dispersing an asphalt having a penetrability of 60 to 80, a process oil and a modifier, adding an additive to cause a reaction for about one hour, adding an antioxidant and a strength reinforcing agent, applying an agitation, and adding an interlayer adherence promoter for last.

The drainage asphalt composite paving method for forming an impermeable intermediate layer and a drainage surface layer with a single paving process as suggested in the present invention includes: melting the non-solidifying rubberized asphalt composition; laying the asphalt composition to a thickness of about 2 to 8 cam at temperature of 130 to 170° C. after applying asphalt for base layer or cutting the asphalt pavement area/cement concrete area to a depth of about 2 to 5 cm; and then applying sand.

In this regard, the asphalt mixture for surface layer as provided in the process subsequent to the process of laying the non-solidifying rubberized asphalt composition and applying the sand may include 90 to 96 wt. % of aggregate having the maximum size of 3 to 13 mm and 4 to 10 wt. % of a drainage modified asphalt binder heated up to 130 to 160° C. The drainage surface layer formed by laying and tamping the asphalt mixture for surface layer has draining and noise-reducing functions.

Hereinafter, a detailed description will be given as to a non-solidifying rubberized asphalt composition for forming an impermeable drainage intermediate layer and a method for forming an impermeable drainage intermediate layer using the non-solidifying rubberized asphalt composition with a simple paving process according to the present invention, which method includes laying a paving material including the non-solidifying rubberized asphalt composition, applying sand and then allowing the non-solidifying rubberized asphalt composition to penetrate into the overlying surface layer during the process of laying the surface layer and performing a tamping.

In the case of using the present invention in a new road pavement, while skipping the step of laying an intermediate layer after the step of laying asphalt for base layer, the non-solidifying rubberized asphalt composition of the present invention is laid to a thickness of about 2 to 8 mm at 130 to 170° C.

Subsequently, any one of silica Nos. 1 to 8 (4 to 200 mesh or 2.5 mm to 0.1 μm in particle diameter) is laid to prevent the non-solidifying rubberized asphalt layer from sticking to the wheels of a truck carrying a finisher or a mixture and taken off.

If there is no equipment for uniform application of silica, the application can be conducted using geofibers, which is used to prevent the non-solidifying rubberized asphalt being adsorbed onto the wheels of the pick-up truck at high temperature during the paving process in the summer season. The geofibers completely melt into the pavement during an application of the surface layer.

Examples of the geofiber as used herein may include synthetic fibers, chemical fibers (e.g., PET, PP, NYLON), etc. Preferably, the geofiber is of a lattice type with a melting temperature of 140° C. or below and pores having an inter-rib distance of 10 to 100 nm.

The high working temperature in the subsequent step of laying a drainage pavement mixture melts down the layer on which the non-solidifying rubberized asphalt composition is laid, and the drainage pavement is then tamped to a thickness of 5 cm. This allows the melted non-solidifying rubberized asphalt composition to penetrate into the overlying drainage pavement and form an impermeable intermediate layer having a thickness of about 1 to 4 cm and a drainage layer having a thickness of 4 to 1 cm at once (See FIG. 2).

In the case of an existing road, the surface layer of the existing road is cut to a depth of 2 to 5 cm, and the non-solidifying rubberized asphalt composition of the present invention is then laid to a thickness of about 2 to 8 mm at 130 to 170° C.

Subsequently, in the same manner of a new road case, any one of silica Nos. 1 to 8 (4 to 200 mesh or 2.5 mm to 0.1 μm in particle diameter) is laid to prevent the non-solidifying rubberized asphalt layer from sticking to the wheels of a truck carrying a finisher or a mixture and taken off. Of course, this can also incidentally repair the cracks or turtle-back ruptures on the surface of the existing road.

The high working temperature in the subsequent step of laying a drainage pavement mixture melts down the layer into which the non-solidifying rubberized asphalt composition penetrates. And, tamping the drainage pavement to a thickness of 5 cm forms both a drainage layer having a thickness of 4 to 1 cm and an impermeable intermediate layer having a thickness of about 1 to 4 cm as a result of the layer into which the non-solidifying rubberized asphalt composition penetrates.

In the case of a cement concrete road, it is preferable to cut the formed surface layer to a depth of about 4 cm and then apply the non-solidifying rubberized asphalt composition of the present invention to a thickness of about 4 mm. The subsequent step is performed in the same procedures of the asphalt pavement process to form an impermeable intermediate layer (impermeable layer) and the asphalt mixture layer for drainage surface layer, each as thick as 2 cm.

Under necessity, the thickness of the impermeable intermediate layer (i.e., impermeable layer) and the drainage surface layer (i.e., drainage layer) formed using the non-solidifying rubberized asphalt composition may be suitably varied according to the paving situations.

For example, after the non-solidifying rubberized asphalt composition of the present invention is laid to a thickness of 4 mm, the paving process may be performed to form the impermeable intermediate layer in a thickness of 2 cm and the drainage surface layer in a thickness of 3 cm.

Further, after the surface layer formed using the cement concrete is cut to a depth of 5 cm and the non-solidifying rubberized asphalt composition of the present invention is laid to a thickness of about 4 to 6 mm, the paving process may be performed to form the impermeable intermediate layer in a thickness of 2 to 3 cm and the drainage surface layer in a thickness of 3 to 2 cm.

When the non-solidifying rubberized asphalt composition is laid to a thickness of 4 to 6 cm and the subsequent process of providing the drainage surface layer is then performed, the high working temperature in the subsequent process causes an increase in the fluidity and allows the non-solidifying rubberized asphalt composition to penetrate into the bottom of the surface layer, completing the final impermeable intermediate layer.

Accordingly, the bottom portion of the drainage surface layer into which the non-solidifying rubberized asphalt composition penetrates becomes an impermeable intermediate layer, as illustrated in FIG. 2, and the vicinity of the top portion of the drainage surface layer into which the non-solidifying rubberized asphalt composition does not penetrate acts as a drainage surface layer. Further, the impermeable intermediate layer of the non-solidifying rubberized asphalt composition of the present invention can be varied in thickness by controlling the number of tamping operations and the tamping pressure in the step of laying the surface layer mixture.

In the paving method of the present invention that forms an impermeable intermediate layer and a drainage surface layer at the same time, a drainage pipe may be additionally installed on a side opening, making it possible to prevent a phenomenon of water bath possibly occurring in rich rainfall when water cannot be drained out from the drainage pavement.

In accordance with another embodiment of the present invention, with the surface layer formed of cement concrete cut to a depth of 3 cm and the non-solidifying rubberized asphalt composition of the present invention laid to a thickness of 6 mm, a paving process may be performed to lay the asphalt mixture for drainage surface layer to a thickness of 2 cm and form the impermeable intermediate layer using the non-solidifying rubberized asphalt composition to a thickness of 3 cm in a simultaneous manner.

In accordance with further another embodiment of the present invention, with the surface layer formed of cement concrete cut to a depth of 2 cm and the non-solidifying rubberized asphalt composition of the present invention laid to a thickness of 4 mm, a paving process may be performed to lay the asphalt mixture for drainage surface layer to a thickness of 2 cm and form the impermeable intermediate layer using the non-solidifying rubberized asphalt composition to a thickness of 2 cm in a simultaneous manner.

Such a paving method using the non-solidifying rubberized asphalt of the present invention on a cement concrete layer can overcome the degradation of concrete frequently occurring in the conventional paving method and also prevent reflective cracks caused by the behaviors of the layers different in properties from each other, such as the asphalt mixture layer and the cement concrete layer, thereby providing a structure with higher durability and stability.

The penetration layer formed using the non-solidifying rubberized asphalt composition of the present invention differs in composition from the conventional paving method that involves forming an intermediate layer between the base layer and the surface layer during a paving process using a hot asphalt mixture or a drainage asphalt mixture, so the composition is used in the form of a mixture composition having such properties as elongation, elasticity, tensile strength, waterproofing performance, etc. through the chemical-physical bonding with other components including a modifier.

The non-solidifying rubberized asphalt composition is applied to a thickness of 2 to 8 cm on the top of an asphalt mixture for base layer or a cement concrete at 130 to 170° C. and allowed to penetrate into the drainage surface layer under the heat and pressure applied in the subsequent process of laying and tamping a mixture for drainage surface layer. This can increase the inter-layer adhesive strength and coupling strength and form an impermeable layer that prevents water or moisture from being absorbed into the underlying base layer, thereby securing a waterproofing effect. It also compensates for the stability of the mixture by acting as a bridgehead for the pavement that is susceptible to brittleness at low temperature.

The penetration layer formed of the non-solidifying rubberized asphalt composition of the present invention may be described in detail as follows. The non-solidifying rubberized asphalt composition may be prepared by mixing 80 to 90 wt. % of asphalt having a penetrability of 60 to 80, 5 to 15 wt. % of a modifier, 3 to 10 wt. % of a process oil, 0.5 to 4 wt. % of a strength reinforcing agent, 0.1 to 1 wt. % of an additive, 0.1 to 1 wt. % of an antioxidant, and 0.1 to 0.5 wt. % of an interlayer adherence promoter, and then performing a melt dispersion of the mixture at about 130 to 200° C.

The method for preparing the non-solidifying rubberized asphalt composition of the present invention may include heating asphalt into a liquid, adding a process oil and a modifier at about 130 to 200° C., sequentially adding an additive to cause a reaction for about one hour, adding an antioxidant, a strength reinforcing agent and an additive in sequence, and then completely melting the mixture.

In this regard, when the temperature of the asphalt is below 130° C., the ingredients is dissolved too insufficiently to achieve their functions and it takes too long time in the process. When the temperature of the asphalt is above 200° C., the properties of the ingredients spoil or the inherent properties deteriorates. It is therefore preferable to maintain the temperature of the asphalt in the range of about 130 to 200° C. in the process of mixing the ingredients and performing a melt dispersion of the mixture.

The asphalt having a penetrability of 60 to 80 is to enhance the adhesiveness between the surface layer and the base layer and increase the durability. The asphalt may include straight asphalt, blown asphalt, or natural asphalt, which may be used alone or in combination.

The content of the asphalt is preferably in the range of 80 to 90 wt. %. When the asphalt content is less than 80 wt. %, the ingredients have deterioration in workability in association with dissolution and dispersion and higher viscosity, which makes it more difficult to perform an efficient operation in the paving process. When the asphalt content is greater than 90 wt. %, the product is runny and soft to lower the strength and heat resistance, consequently with deterioration in the properties.

The modifier offers elasticity, tensile strength, tearing strength, etc. for the non-solidifying rubberized asphalt composition of the present invention to increase the stability against fatigue cracks, low-temperature cracks, deformation, or the like. Specific examples of the modifier may include radial type SBS, linear type SBS, styrene-butadiene rubber (SBR), styrene ethylene butadiene styrene (SEBS), styrene-butadiene (SB), ethylene vinyl acetate (EVA), styrene-isoprene-styrene (SIS), APP (Atactic Polypropylene), etc.

The content of the modifier is preferably in the range of 5 to 15 wt. %. When the modifier content is less than 5 wt. %, the modifier is too ineffective to acquire desired properties such as elasticity, durableness, durability, etc., so the resistance to external factors such as load or pressure transferred from the surface layer becomes deteriorate to easily cause cracks at low temperature. When the modifier content is greater than 15 wt. %, the manufacturing process time and the viscosity increase to cause the difficulty in the production and raise the price, thereby bringing about the problem in the economic efficiency.

The process oil helps to enhance the low-temperature performance of the non-solidifying rubberized asphalt of the present invention and the effective melting of the ingredients and may include any of the petroleum-, coal- or vegetable-based oils. Specific examples of the petroleum/coal-based oils may include aromatic oils, naphthene oils, paraffin oils, etc. Specific examples of the vegetable-based oils may include flaxseed oil, soybean oil, rice kernel oil, etc. Those specific process oils may be used alone or in combination.

The content of the process oil is preferably in the range of 3 to 10 wt. %. When the process oil content is 2 wt. % or less, the used amount is so little to increase the viscosity of the product, deteriorate the low-temperature performance and also increase the melting time of the ingredients, causing an increase of the production time. When the process oil content is greater than 7 wt. %, the product has lower viscosity and becomes runny and soft, thus seriously deteriorating the stability or strength of the product at low temperature and making it difficult to secure good properties.

The strength reinforcing agent is a material to consistently maintain the non-solidifying property of the non-solidifying rubberized asphalt of the present invention after the paving process and enhance the strength enough to endure the pressure and impacts transferred from the top layer portion. The strength reinforcing agent may include synthetic resins, such as polypropylene, polyethylene, polystyrene, low-density polyethylene (LDPE), high-density polyethylene (HDPE), etc., which may be used alone or in combination.

The content of the strength reinforcing agent is preferably in the range of 0.5 to 4 wt. %. When the content of the strength reinforcing agent is less than 0.5 wt. %, it is too little to enhance the strength of the product. When the content of the strength reinforcing agent is greater than 4 wt. %, the product becomes so hard as to deteriorate the non-solidifying property, deteriorates in the restoring force and elasticity against the impact and has the higher occurrence rate of cracks, causing deterioration in the waterproofing function in the case of an incident penetration of water or moisture.

The additive used in the non-solidifying rubberized asphalt composition of the present invention may include an antioxidant. The antioxidant is a material prepared by concentrating and powdering different kinds of acid-based oxides through organochemical reactions and used to promote and activate the cross-linking between substances in the preparation of non-solidifying rubberized asphalt, thereby preventing oxidation and ageing of the product, suppressing the separation of ingredients and securing stability. Specific examples of the additive may include acid-based additives such as of inorganic acids or organic acids.

The content of the additive is preferably in the range of 0.1 to 1.0 wt. %. When the additive content is less than 0.1 wt. %, the amount of the additive is too little to acquire the effects. When the additive content is greater than 1.0 wt. %, the constituent ingredients including asphalt are susceptible to diversification to adversely deteriorate the performance of the product.

It is desirable to use an antioxidant in order to prevent decomposition of the modifier used in the non-solidifying asphalt composition of the present invention and to stabilize the final composition. Examples of the antioxidant as used herein may include quinones, amines, phenols, aminophenols, alkyl phenol, alkyl phenylene diamine, phenyl-β-naphthylamine, etc.

The content of the antioxidant is preferably in the range of 0.1 to 1 wt. %. When the content of the antioxidant is less than 0.1 wt. %, the effect of the antioxidant on the reaction is insignificant. When the content of the antioxidant is greater than 1 wt. %, the production cost increases to bring about a potential deterioration in the competitiveness of the product. Using the antioxidant enables the non-solidifying rubberized asphalt composition to secure stability, avoiding any deterioration in the properties of the product even when exposed to the unfavorable environment, such as heat, oxygen, ozone, foreign substances, etc. for a long time.

In addition, the non-solidifying asphalt composition of the present invention may further include an interlayer adherence promoter in order to increase the adherence between the cut-off layer, the binder and the mixture of the surface layer. The interlayer adherence promoter as used herein may include at least one selected from the group consisting of siloxanes (e.g., dialkylsiloxane (DAS), diphenylsiloxane (DPS), trimethylsiloxane (TMS), dimethylsiloxane (DMS), etc.), and amines (e.g., monoamine, diamine, polyamine, aliphatic amine, aromatic amine, etc.).

The content of the interlayer adherence promoter is preferably in the range of 0.1 to 0.5 wt. %. When the content of the interlayer adherence promoter is less than 0.1 wt. %, the effect of the interlayer adherence promoter to enhance the interlayer adherence is insignificant. When the content of the interlayer adherence promoter is greater than 0.5 wt. %, the production cost increases due to the high price of the interlayer adherence promoter and leads to deterioration in the competitiveness of the product.

The penetration layer formed using the non-solidifying rubberized asphalt composition of the present invention including the above-mentioned ingredients is laid on the asphalt mixture for base layer or the cement concrete to a thickness of 2 to 8 mm at 130 to 170° C., and sand is then applied on the penetration layer. Onto the sand is applied the asphalt mixture for drainage surface layer.

In this regard, the process temperature in the process of laying the non-solidifying rubberized asphalt is preferably maintained in the range of 130 to 170° C. When the paving process temperature is below 130° C. (particularly in winter season), the exterior temperature and the low temperature of the underlying pavement layer cause an abrupt drop of the product temperature and increase the viscosity, making it impossible to perform a uniform paving operation, and the tamping effect on the surface layer in the subsequent tamping step becomes too insignificant to achieve an adequate tamping.

When the paving process temperature is above 170° C., such a high temperature may change the properties of the product and risk the worker in regards to safety and lead to an unnecessary overuse of the fuels.

The paving (applying) thickness of the non-solidifying rubberized asphalt composition is preferably in the range of 2 to 8 mm. When the paving thickness is less than 2 mm, the asphalt composition is laid too thin with an extremely low amount to properly form an impermeable intermediate layer in the subsequent step with the given amount of the non-solidifying rubberized asphalt composition remaining after absorption/adhering to the underlying base layer.

In other words, the heat and pressure applied in the subsequent step of laying a mixture for surface layer have the non-solidifying rubberized asphalt composition melt down, move up towards the bottom of the mixture for surface layer and adhesively bind with the bottom portion of the surface layer. With this, a penetration layer (i.e., impermeable intermediate layer) cannot be formed at all, making it impossible to achieve the object of the present invention in all the aspects regarding resistance to water or moisture penetration, inter-layer durability, resistance to cracks, stability at low temperature, etc.

On the other hand, when the paving thickness is greater than 8 mm, the asphalt composition is laid so thick as to have an extremely large amount of the non-solidifying rubberized asphalt composition move up to the surface layer under the heat and pressure in the process of laying the surface layer, thereby clogging the pores between the aggregates and causing a bleeding phenomenon.

In other words, more than half the pores in the pavement for drainage surface layer are filled with the non-solidifying rubberized asphalt composition, so the important functions of the drainage pavement, that is, waterproofing and noise-reducing functions cannot be secured. In addition, such an unnecessarily large paving thickness deteriorates processability and workability and increases the material cost.

The viscosity of the non-solidifying rubberized asphalt composition is preferably maintained in the range of 100 to 3,000 cP at 130 to 170° C. When the viscosity is less than 100 cP at the defined paving temperature, it may be impossible to form a desired waterproof layer (i.e., impermeable layer) as the non-solidifying rubberized asphalt composition becomes absorbed into the asphalt mixture layer for base layer. Otherwise, when the viscosity is greater than 3,000 cP, such an extremely high viscosity makes it impossible to move the penetration layer with the non-solidifying rubberized asphalt composition up to a desired height towards the bottom of the drainage surface layer during the subsequent tamping process.

The sand like silica applied immediately after the non-solidifying rubberized asphalt composition is laid can increase the strength of the product and help the efficient paving operation by preventing the non-solidifying rubberized asphalt composition from sticking to the tamping machine during the tamping process. Preferably, the sand (i.e., silica) is of a size Nos. 1 to 8 (4 to 200 mesh or 2.5 mm to 0.1 μm).

The re-melting temperature for the non-solidifying rubberized asphalt composition is preferably in the range of 130 to 170° C., which is the same as the paving temperature range. When the re-melting temperature is below 130 SC, the viscosity of the product increases to take much time and difficulty in the operation. When the re-melting temperature is above 170° C., the viscosity of the product is so low as to increase the amount of the non-solidifying rubberized asphalt composition absorbed into the base layer, cause the difficulty in selecting a proper applied amount and change the properties of the product by the high heat applied.

Preferably, the size of the aggregate used in the asphalt mixture for drainage surface layer according to the present invention is 3 to 13 mm, and the porosity of the drainage asphalt mixture applied is at least 20%. The particle size of the aggregate is preferably in the range that satisfies specifications of Seoul, the Ministry of Construction and Transportation, and Korea Expressway Corporation in regards to the particle size range of the aggregate for low-noise drainage asphalt pavement.

The method of forming an impermeable drainage intermediate layer with a single paving process using a non-solidifying rubberized asphalt composition for impermeable drainage intermediate layer according to the present invention, which method involves laying a base layer, a penetration layer (i.e., impermeable intermediate layer) using the non-solidifying rubberized asphalt composition and a (drainage) surface layer in sequential order from bottom to top, maintains a noise-reducing function and a draining function to effectively drain water or moisture in rich rainfall or heavy snow, has the non-solidifying rubberized asphalt of the penetration layer completely prevent incidental penetration of water or moisture into the base layer, securing an impermeable function to protect the ground against water, and enhances the inter-layer adhesiveness to prevent distortion or deformation caused by the load or pressure transferred from the surface layer.

Furthermore, excellent properties in regards to elasticity, stability, durableness, and durability suppresses fatigue cracks and enhances resistance to brittleness at low temperature, thereby maintaining the pavement structure with safety under the situations of erosion and sinkage. And, the non-solidifying rubberized asphalt melt down and moving up during the formation of the surface layer firmly binds with the aggregate to prevent occurrence of separation of layers, cracks or desorption due to the behaviors.

Example 1

The properties of the non-solidifying rubberized asphalt composition of the present invention are specified in Table 1. The tests of Table 1 are performed according to the Japanese bridge steel cast waterproof standards. In this regard, an example of the non-solidifying rubberized asphalt composition uses AP5 as asphalt, an aroma-based oil as a process oil, SBS 501 as a modifier, LDPE 9205 as a strength reinforcing agent, and an antioxidant, etc. as an additive. The specific composition ratio is as presented in Table 1.

TABLE 1

| | Composition (wt. %) | | | | |
| | Experimental Example | | Comparative Example | | |
| Div. | 1 | 2 | 1 | 2 | Div. |
|---|---|---|---|---|---|
| Asphalt | 82 | 84 | 78 | 83.5 | AP-5 |
| Modifier | 8 | 7 | 10 | 7 | Linear type |
| Process oil | 7.7 | 6.5 | 7 | 8 | Aroma type |
| Antioxidant | 0.5 | 0.6 | — | — | Phenyl-β-naphthylamine |
| Strength reinforcing agent | 1 | 1.2 | 4.7 | 1 | Polyethylene type |
| Additive | 0.5 | 0.5 | 0.3 | 0.5 | Acid type mixture |
| Adherence promoter | 0.3 | 0.2 | — | — | Silane(mercaptopropyl trimethoxy) |

TABLE 2

| Test item | | Japanese Standards | Non-solidifying rubberized asphalt composition | | | | Test method |
|---|---|---|---|---|---|---|---|
| | | | Experimental Example | | Comparative Example | | |
| | | | 1 | 2 | 1 | 2 | |
| Softening temp. [° C.] | | 80 or above | 90 | 92 | 95 | 91 | JIS K 2207 |
| Tensile strength [N] @23° C. | | 0.35 or above | 0.68 | 0.70 | 0.77 | 0.67 | JIS A 6021 |
| Viscosity [cP] | [130° C.] | — | 2870 | 2960 | 5010 | 3000 | KS F 2392 |
| | [140° C.] | — | 2450 | 2500 | 4200 | 2370 | |
| | [150° C.] | — | 1910 | 2110 | 3550 | 1900 | |
| | [160° C.] | — | 1230 | 1340 | 2480 | 1320 | |
| | [170° C.] | — | 720 | 980 | 1500 | 810 | |
| Long-term storage 163° C. ± 5 [7 days] | | — | Normal | Normal | Phase separation | Phase separation | Self test |
| Elongation at break [%] | | 300 or above | 700 | 670 | 770 | 690 | JIS A 6021 |
| Alkali resistance* | | Must be normal | Normal | Normal | Normal | Normal | JIS K5600-6-1 |
| Saline resistance** | | Must be normal | Normal | Normal | Normal | Normal | JIS K5600-6-1 |
| Print resistance*** | | Must not be printed | Not printed | Not printed | Not printed | Not printed | *** |

Note)
*Immersed in saturated calcium hydroxide solution for 15 days
**Immersed in 3% sodium chloride solution for 15 days.
***Test according to 'Peel-off loading test' on page 144 of "Road Bridge Cast Waterproof Manual".

As can be seen from Table 2, the properties of the non-solidifying rubberized asphalt composition of Experimental Examples 1 and 2 satisfy the Japanese Bridge Steel Cast Waterproof Standards and display the higher performances. Particularly, the tensile strength and the elongation performance are about twice the Japanese standards. This shows that the asphalt composition is excellent in the resistance to the external force and pressure transferred between the layers. Further, the results of the alkali resistance test and the saline resistance test imply that the non-solidifying rubberized asphalt composition of the present invention makes the properties of the product maintain safely rather than deteriorate even when exposed to chemicals or salt as well as water or moisture.

Figure 11:
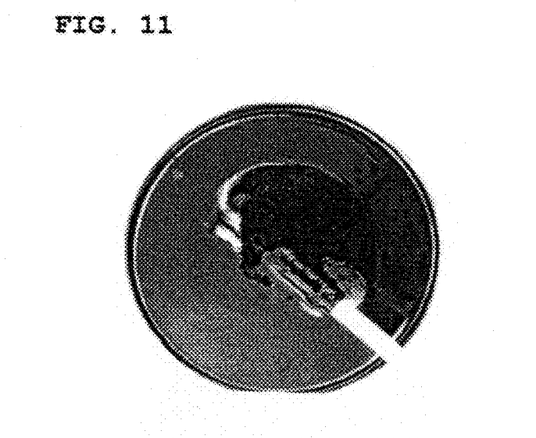
FIGS. 11 and 12 are images showing a composition without phase separation and a composition with phase composition, respectively.
Figure 12:
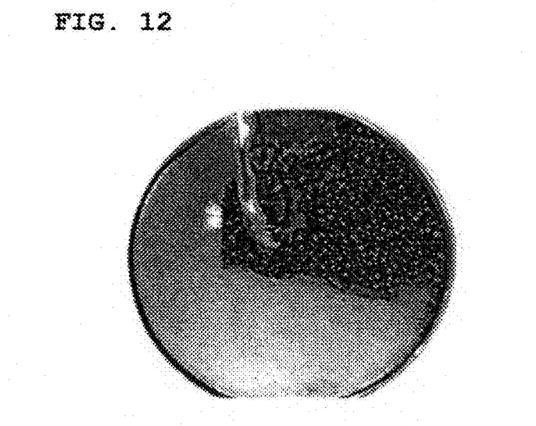

However, as can be seen from Table 2, the long-term storage test demonstrates that the compositions of Experimental Examples 1 and 2 are maintained stable without a change of the product under the above conditions, while the compositions of Comparative Examples 1 and 2 not using an antioxidant have a change of the properties and phase separation. FIG. 11 is a photographic image of Experimental Example 1 that has no phase separation; and FIG. 12 is a photographic image of Comparative Example 2 that has a phase separation. The composition of Comparative Example 1 displays high viscosity, which does not satisfy the viscosity range of the present invention.

According to the results of the property measurements, the excellent tensile and elongation performances of the penetrated (impermeable) layer formed using the non-solidifying rubberized asphalt composition of the present invention contribute to high stability for the pavement which is susceptible to brittleness at low temperature due to the characteristics of the aggregates having high hardness and high strength, thereby making an effect of increasing the lifespan of the road and enhancing the present serviceability.

Example 2

The mixture for drainage surface layer according to the present invention as prepared by the composition and method of Table 3 is subjected to the drainage asphalt mixture quality standards and tests. The results are presented in Table 4.

TABLE 3

| | Item | Mixing ratio (wt %) | Div. |
|---|---|---|---|
| Ingredient | Aggregate | 94.7 | 165° C., including fillers |
| | Drainage modified asphalt binder | 5.3 | 160° C. |
| | Tempering time | 50 sec. | Until discharged |
| | Tamping temperature | 150° C. | First tamping temperature |
| | Tamping frequency | 50 times on both sides | Based on drainage modified asphalt |

TABLE 4

| | Quality standards | | | |
|---|---|---|---|---|
| Test items | Ministry of Land, Transport and Maritime Affairs | Korea Expressway Corporation | Seoul City | Test results |
| Stability [kg] | ≥500 | ≥500 | ≥500 | 617 |
| Water-quality Marshall retained stability [%] | ≥75 | ≥75 | ≥75 | 82 |
| Porosity [%] | ≥20 | ≥20 | ≥20 | 20.5 |
| Dynamic stability | ≥3,000 | ≥3,000 | ≥3,000 | 5,480 |

TABLE 4-continued

| | Quality standards | | | |
|---|---|---|---|---|
| Test items | Ministry of Land, Transport and Maritime Affairs | Korea Expressway Corporation | Seoul City | Test results |
| [frequency/mm] In-situ permeability [sec] | ≥15 sec/1 L | — | — | N/A |
| Tamping frequency | 50 times on both sides | 50 times on both sides | 50 times on both sides | 50 times on both sides |
| Drain-down value [1/100 cm] | 20~40 | — | — | 28 |
| Cantabro abrasion [%] | ≤20 | — | ≤20 | 8.60 |

As can be seen from the test results of Table 4, the asphalt mixture for drainage surface layer according to Example 2 of the present invention satisfies all the quality standards of the Ministry of Land, Transport and Maritime Affairs, the Korea Expressway Corporation, and Seoul City and displays excellent properties exceeding the standard values.

Example 3

The non-solidified rubberized asphalt layer (penetration layer) and the asphalt mixture for drainage surface layer according to the present invention are evaluated in regards to the performances and standards with reference to Examples 1 and 2. The evaluation results are used to perform a paving operation in regards to the method of paving an impermeable intermediate layer and a drainage pavement at the same time with a single paving process according to the present invention. The specific composition used herein is as presented in Table 5.

TABLE 5

| Item | Standards/Property | | Div. |
|---|---|---|---|
| Mixture for base layer | KS standards | | Maximum aggregate size = 25 mm |
| Non-solidifying asphalt composition (Experimental Example 1) | Viscosity @150° C. | 1910 cP | Laid to thickness of 4 mm considering diameter of test specimen and specific gravity of materials |
| | Permeability | 61 | |
| | Softening temperature | 90° C. | |
| Mixture for drainage surface layer | Mixture satisfying quality standards in Example 2 | | Maximum aggregate size = 3~13 mm |

On the tamped surface layer of the asphalt mixture for base layer are laid a non-solidifying rubberized asphalt (penetration layer) having a viscosity of 1910 cP at 150° C. and then a mixture for drainage surface layer at 150° C. Subsequently, a tamping process is performed 50 times. The equipment used in the tamping step may be any one of an at least 8 ton macadam roller, an at least 6 ton 2-shaft tandem roller, or an at least 10 ton tire roller. The tamping process is performed to at least 96% of the reference density.

For a comparison, a comparative example is prepared to have the same ingredients of the non-solidifying rubberized asphalt composition of the Example 3 according to the present invention and display properties other than viscosity almost equivalent to those of the Example 3 by changing the composition ratio (See Table 6). The measurement results are compared with those of Example 3 and presented in Table 7.

TABLE 6

| Item | Standards/Property | | Div. |
|---|---|---|---|
| Asphalt mixture for base layer | KS standards | | Maximum aggregate size = 25 mm |
| Non-solidifying asphalt composition (Comparative Example 1) | Viscosity @150° C. | 3,500 cP | Laid to thickness of 4 mm considering diameter of test specimen and specific gravity of materials |
| | Permeability | 46 | |
| | Softening temperature | 95° C. | |
| Mixture for drainage surface layer | Mixture satisfying quality standards in Example 2 | | Maximum aggregate size = 3~13 mm |

Unlike the Example 1, the Comparative Example 1 uses a non-solidifying rubberized asphalt composition having a viscosity of 3,550 cP at 150° C. on the surface layer overlying the mixture for base layer after a tamping process, while the other paving conditions including the application of the mixture for surface layer are the same as specified in the Example 3. In other words, the non-solidifying rubberized asphalt is applied to a thickness of 4 mm, the mixture for drainage surface layer is laid at 150° C., and the tamping operation (on both sides) is performed 50 times.

Figure 3:
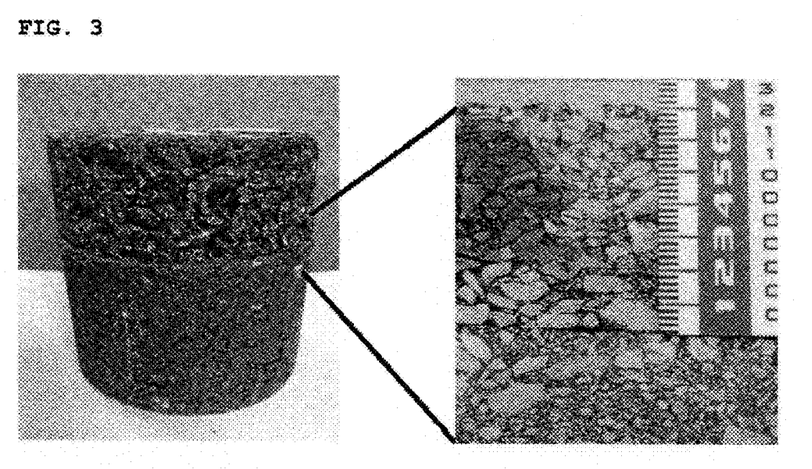
FIG. 3 is an image showing the cross-section of a drainage asphalt pavement according to Example 2 of the present invention.
Figure 4:
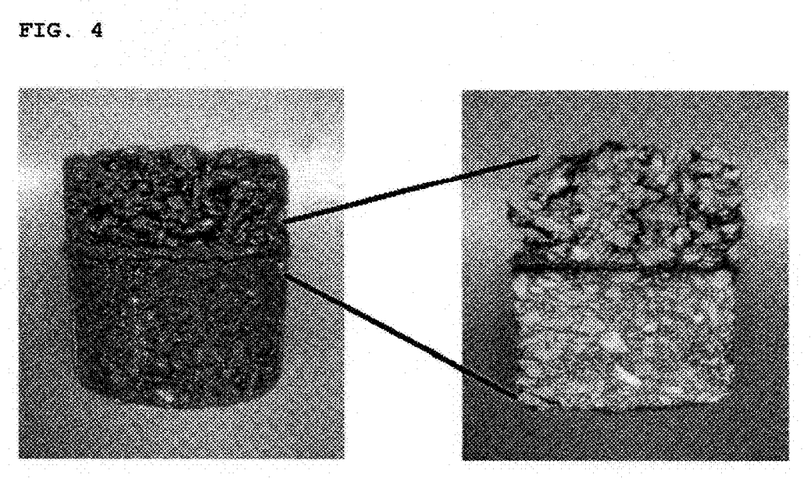
FIG. 4 is an image showing the cross-section of a drainage asphalt pavement according to Comparative Example.

Test specimens with an impermeable layer of Experimental Example 1 and Comparative Example 1 as prepared by the above-described method and their cross-sectional images are shown in FIGS. 3 and 4, respectively.

The results of using the composition of Experimental Example 1 shows that the penetration layer with the non-solidifying rubberized asphalt composition having a viscosity of 1910 cP at 150° C. moves up to about 2 cm towards the bottom of the surface layer to form an impermeable layer (See FIG. 3). In the case of the Comparative Example 1, the non-solidifying rubberized asphalt (penetration layer) having a viscosity of 3,550 cP at 150° C. does not move up towards the surface layer during the tamping process due to its high viscosity, forming no impermeable layer, so the binder is forced to the sides of the test specimen (See FIG. 4).

As can be seen from the results of the comparative experiment between Experimental Example 1 and Comparative Example 1, the optimum viscosity of the non-solidifying rubberized asphalt composition of the present invention is preferably in the range of 100 to 3,000 cP at 130 to 170° C.

Example 4

Examples varied in the ranges of cutting cement concrete and forming the impermeable layer and an example having a drainage hole in preparation for the water bath phenomenon are illustrated in FIGS. 5 to 8.

Figure 5:
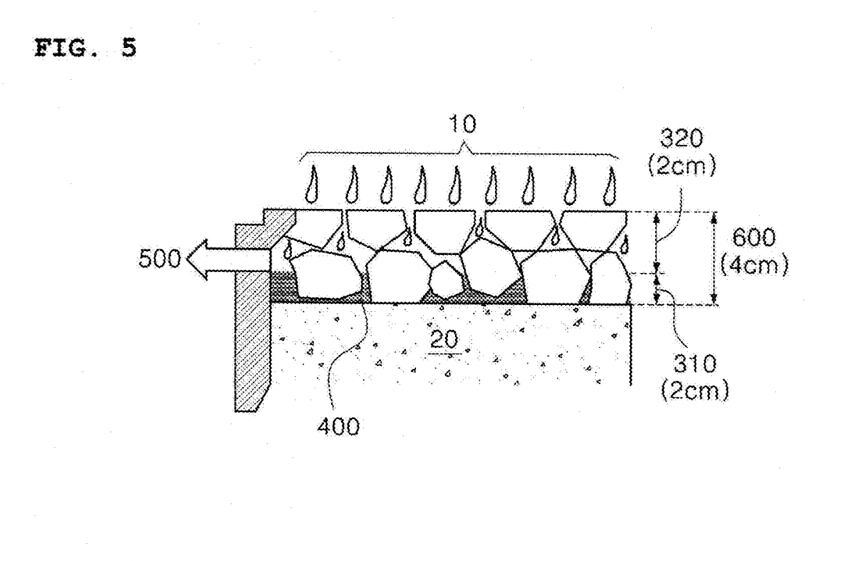
FIGS. 5 to 8 are illustrations showing different examples of the present invention.
Figure 9:
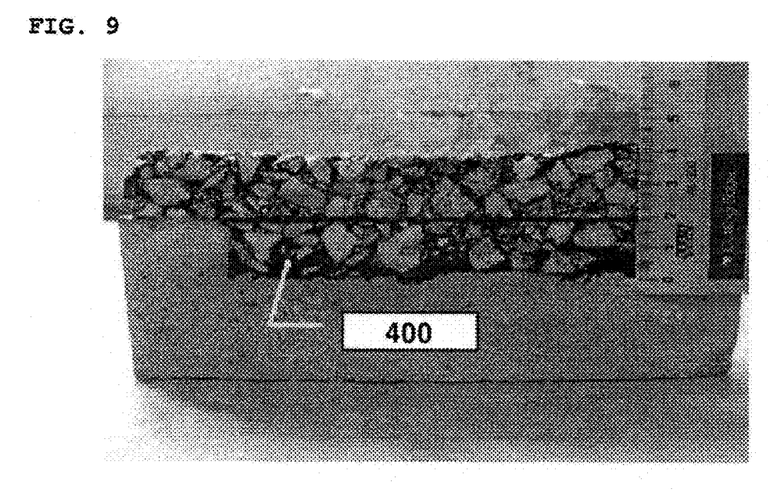
FIGS. 9 and 10 are images showing the cross-section of the actual pavements of FIGS. 5 and 6 according to the present invention, respectively.

FIG. 5 shows a pavement example that with a cement concrete layer cut to a depth of 4 cm and then a non-solidifying rubberized asphalt laid to 4 mm thickness, an asphalt mixture for drainage surface layer is applied to a thickness of 2 cm and, at the same time, an (impermeable) intermediate layer is formed to a thickness of 2 cm. The cross-sectional image of the actual pavement is illustrated in FIG. 9.

Figure 6:
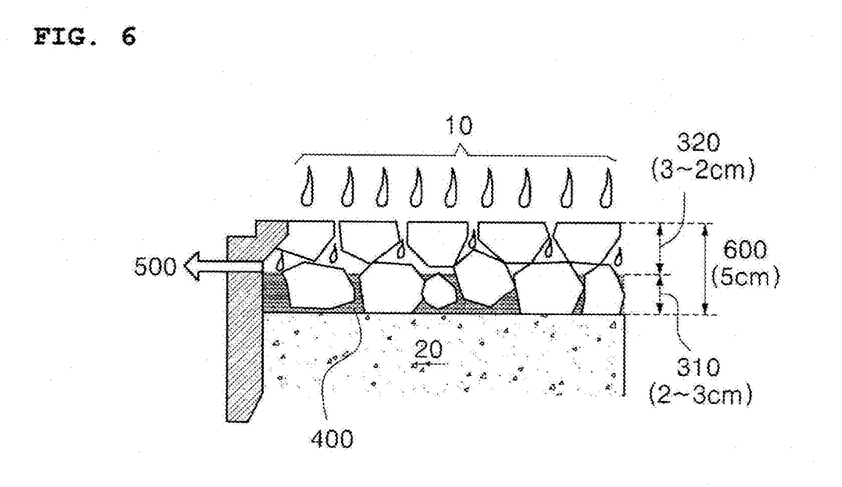
Figure 10:
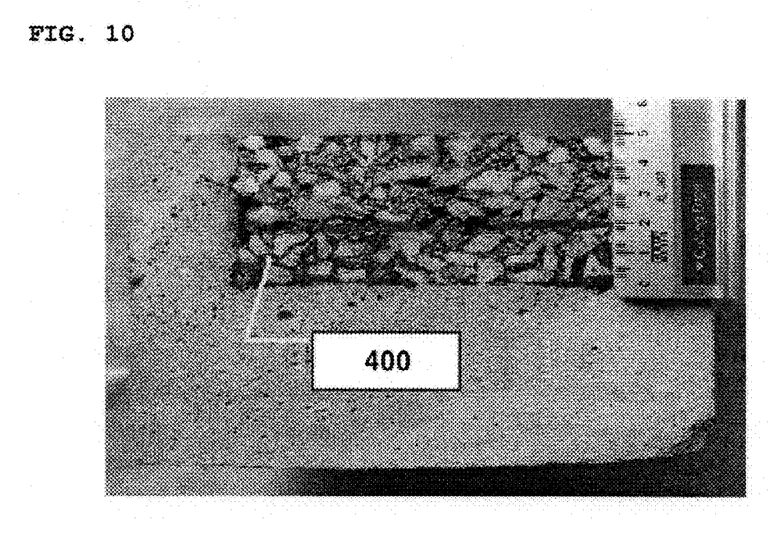

FIG. 6 shows a pavement example that with a cement concrete layer cut to a depth of 5 cm and then a non-solidifying rubberized asphalt laid to 4 to 6 mm thickness, an asphalt mixture for drainage surface layer is applied to a thickness of 3 to 2 cm and, at the same time, an (impermeable) intermediate layer is formed to a thickness of 2 to 3 cm. The cross-sectional image of the actual pavement is illustrated in FIG. 10.

In FIGS. 5 and 6, a pavement side opening (drainage hole) for water discharge is formed on the left side and connected to a drainage path. Such a side opening for prevention of the water bath phenomenon may be provided in any modification of the present invention including the above-described specific pavement example.

Figure 7:
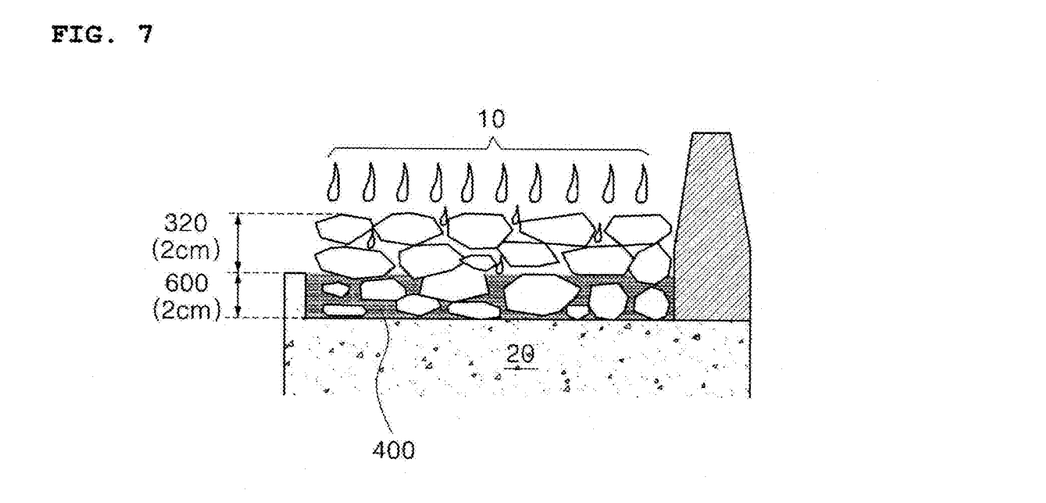
Figure 8:
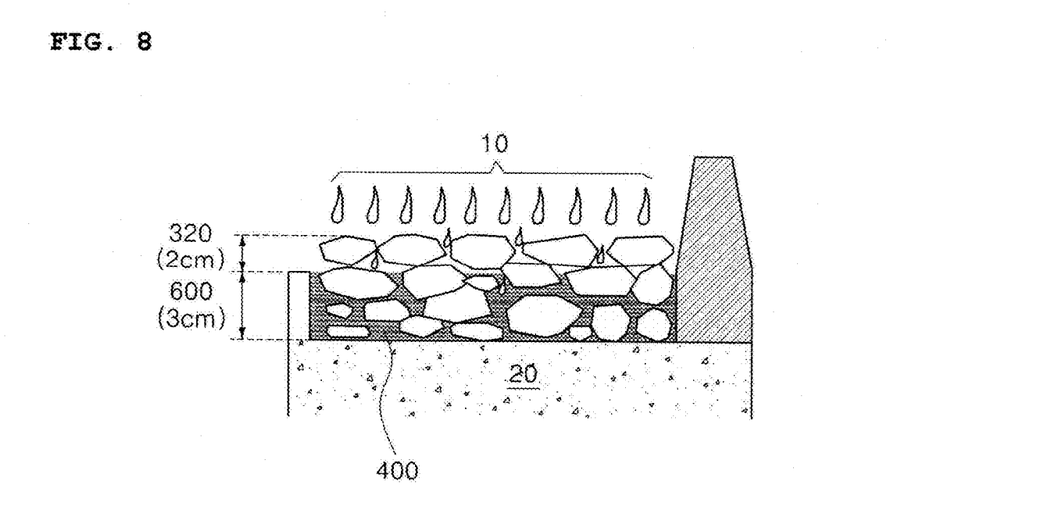

FIG. 7 shows a pavement example that with the surface layer portion of cement concrete cut to a depth of 2 cm and then the non-solidifying rubberized asphalt of the present invention laid to 4 mm thickness, an asphalt mixture for drainage surface layer is applied to a thickness of 2 cm and, at the same time, an (impermeable) intermediate layer is formed to a thickness of 2 cm. FIG. 8 shows a pavement example that with the surface layer portion of cement concrete cut to a depth of 3 cm and then the non-solidifying rubberized asphalt of the present invention laid to 6 mm thickness, an asphalt mixture for drainage surface layer is applied to a thickness of 2 cm and, at the same time, an (impermeable) intermediate layer is formed to a thickness of 3 cm.

The specific pavement examples of the paving method using the non-solidifying rubberized asphalt (penetration layer) of the present invention as an intermediate layer as described above are presented in summary in Table 7. The modification examples of the present invention are not limited to those in the following table but may be applied to the existing asphalt roads as well as the cement concrete roads. It is, of course, apparent that a variety of modifications of the present invention may be provided under necessity.

TABLE 7

| | Modification example | | | | |
|---|---|---|---|---|---|
| Div. | 1 | 2 | 3 | 4 | 5 |
| Cutting thickness (cm) | 2 | 3 | 4 | 4 | 5 |
| Coating thickness of non-solidifying rubberized asphalt composition (mm) | 4 | 6 | 4 | 4 | 4~6 |
| Thickness of impermeable intermediate layer (cm) | 2 | 3 | 2 | 2 | 2~3 |
| Thickness of drainage surface layer (cm) | 2 | 2 | 2 | 3 | 3~2 |

Example 5

The adhesive strengths with the underlying base layer and the overlying surface layer that is the advantage of the impermeable intermediate layer formed using the non-solidifying rubberized asphalt composition of the present invention are measured by way of an actual specimen.

First of all, in order to evaluate the tensile adhesive strength with the concrete asphalt layer, the composition of Experimental Example 1 is applied to a thickness of 4 mm on a cement concrete specimen at 170° C. (viscosity: 720 cP), and an asphalt concrete mixture is laid on the asphalt composition at 170° C. and then tamped 50 times. Then, the tensile adhesive strength is measured at the room temperature of 20° C.

Further, in order to evaluate the tensile adhesive strength with the asphalt concrete mixture layer, the same procedures are performed to apply the non-solidifying rubberized asphalt composition of the present invention to a thickness of 4 mm on a cement concrete specimen at 170° C. (viscosity: 720 cP), lay an asphalt concrete mixture on the asphalt composition at 170° C. and then perform a tamping process 50 times. Then, the tensile adhesive strength is measured at 20° C. The measurement results are presented in Table 8.

As can be seen from the tensile adhesive strength measurement results, the asphalt composition of Experimental Example 1 containing an adherence promoter according to the present invention exhibits good properties that satisfy the Korean road surface standards (KSF4932) on the tensile adhesive strength (low temperature of −20° C. and high temperature of 20° C.) of the waterproof material, while the asphalt composition of Comparative Example 2 not containing an adherence promoter displays a low tensile adhesive strength even at a similar mixing ratio.

TABLE 8

| | | | Experimental Example 1 | | Comparative Example 2 | | |
|---|---|---|---|---|---|---|---|
| Test item | Standards | | Base layer of cement concrete | Base layer of asphalt concrete mixture | Base layer of cement concrete | Base layer of asphalt concrete mixture | Test method |
| Tensile adhesive strength [N/mm²] | 20° C. | 0.6 or above | 0.84 | 0.88 | 0.50 | 0.58 | KSF 4932 |
| | −20° C. | 1.2 or above | 1.5 | 1.6 | 1.0 | 1.04 | |

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A drainage asphalt composite paving method, which can be used to form an impermeable intermediate layer and a drainage surface layer with a single paving process, the method comprising:
(1) laying a non-solidifying rubberized asphalt composition to a thickness of 2 to 8 mm on the surface of a surface-cut asphalt, cement concrete or base layer;
(2) applying sand on the non-solidifying rubberized asphalt composition laid in the step (1); and
(3) laying a mixture for drainage surface layer on the sand applied in the step (2) and performing a tamping,
wherein the non-solidifying rubberized asphalt composition comprises 80 to 90 wt. % of asphalt having a penetrability of 60 to 80, 5 to 15 wt. % of a modifier, 3 to 10 wt. % of a process oil, 0.5 to 4 wt. % of a strength reinforcing agent, 0.1 to 1 wt. % of an additive, 0.1 to 1 wt. % of an antioxidant, and 0.1 to 0.5 wt. % of an interlayer adherence promoter, and has a viscosity of 3,000 to 100 cP at temperature of 130 to 170° C., and
wherein the tamping process of the step (3) allows the non-solidifying rubberized asphalt composition to penetrate into the drainage surface layer and form the impermeable drainage intermediate layer.

2. The drainage asphalt composite paving method as claimed in claim 1, wherein the non-solidifying rubberized asphalt composition is laid at temperature of 130 to 170° C.

3. The drainage asphalt composite paving method as claimed in claim 1, wherein in the step (3), the drainage surface layer is formed using aggregate having the maximum size of 3 to 13 mm and a porosity of at least 20%.

4. The drainage asphalt composite paving method as claimed in claim 1, wherein in the step (2), the sand applied is silica having a particle diameter of 2 to 200 mesh or 2.5 mm to 0.1 μm.

5. The drainage asphalt composite paving method as claimed in claim 1, wherein in the step (3), the composition for drainage surface layer comprises 90 to 96 wt % of aggregate and 4 to 10 wt. % of a drainage modified asphalt binder heated up to 130 to 160° C.

6. The drainage asphalt composite paving method as claimed in claim 1, wherein the non-solidifying rubberized asphalt composition is prepared by mixing and dispersing an asphalt having a penetrability of 60 to 80, a process oil and a modifier, adding an additive to cause a reaction for about one hour, adding an antioxidant and a strength reinforcing agent, applying an agitation, and adding an interlayer adherence promoter for last.

* * * * *

UNITED STATES PATENT AND TRADEMARK OFFICE
CERTIFICATE OF CORRECTION

PATENT NO. : 9,611,592 B2
APPLICATION NO. : 15/012236
DATED : April 4, 2017
INVENTOR(S) : Seng Woo Yoon and Jang Sup Kim Page 1 of 1

It is certified that error appears in the above-identified patent and that said Letters Patent is hereby corrected as shown below:

On the Title Page

Item (54) "NON-SOLIDIFYING RUBBERIZED ASPHALT COMPOSITION FOR PROVIDING INPERMEABLE INTERMEADIATE DRAINAGE LAYER AND METHOD FOR PROVIDING INPERMEABLE INTERMEDIATE DRAINAGE LAYER WITH SINGLE PAVING PROCESS USING THE SAME" needs to be deleted and replaced with -- NON-SOLIDIFYING RUBBERIZED ASPHALT COMPOSITION FOR PROVIDING IMPERMEABLE INTERMEDIATE DRAINAGE LAYER AND METHOD FOR PROVIDING IMPERMEABLE INTERMEDIATE DRAINAGE LAYER WITH SINGLE PAVING PROCESS USING THE SAME --.

In the Specification

Column 8, Line 59, "deteriorates" needs to be deleted and replaced with -- deteriorate --.

Column 11, Line 62, "130 SC" needs to be deleted and replaced with -- 130 °C --.

Signed and Sealed this
Thirtieth Day of May, 2017

Michelle K. Lee
*Director of the United States Patent and Trademark Office*